Aug. 31, 1926.

O. J. KUHLKE 1,597,904

METHOD OF MANUFACTURING GOLF BALLS

Filed March 18, 1924

Inventor
Otto J. Kuhlke.

By
Attorney

Patented Aug. 31, 1926.

1,597,904

UNITED STATES PATENT OFFICE.

OTTO J. KUHLKE, OF AKRON, OHIO.

METHOD OF MANUFACTURING GOLF BALLS.

Application filed March 18, 1924. Serial No. 700,050.

This invention relates to the manufacture of golf balls and has for its object the production of an improved method of making golf balls, whereby, an inexpensive ball will be made having the required liveliness, weight, accuracy and other desirable properties. As an important feature of the invention there is provided a wire wound sphere the convolutions or interstices of which are filled with rubber, the center of the sphere containing sponge rubber. The whole structure is enclosed and encased in a suitable covering.

It will be appreciated that the invention is susceptible of embodiment in other form than the specific form shown and described herein and such changes and modifications are intended to be covered herein.

In the drawings are shown the various steps of the process and the completed ball in which.

Figure 1:
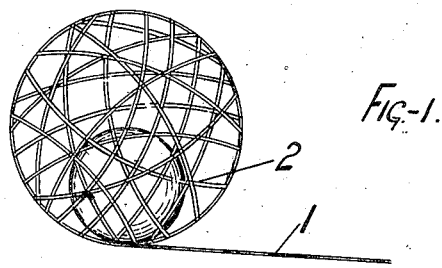
Fig. 1, is a view showing the first steps in the manufacture of the ball.

The ball of the present invention comprises as an element by which it is given resilience and weight, a sphere comprising a strand of wire which is wound into the form of a sphere the various convolutions which go to make up the sphere being wound upon one another until a hollow ball is obtained, the wall of which is highly resilient and are not liable to be dented or deformed. The numeral 1 indicates a steel wire of the required temper. This wire is wound upon itself in a plurality of overlying convolutions. In Fig. 1 the sphere is shown during the process of manufacture at which time the convolutions of the wire are opened sufficiently so that a piece or mass of rubber 2 can be inserted within the hollow sphere. This mass of rubber is compounded with or carries within it a volatile substance, indicated at 3, which upon heating during vulcanization will expand to form sponge rubber.

Figure 2:
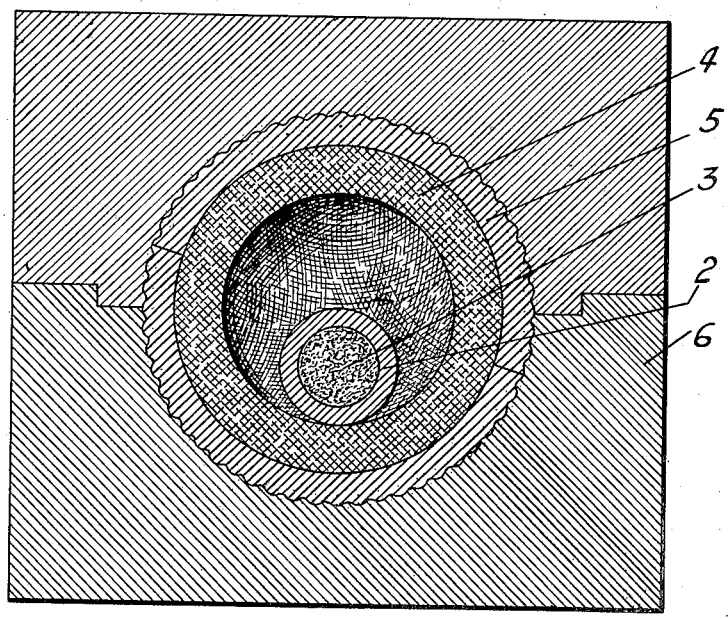
Fig. 2, shows the ball in the mold or vulcanizer in which it is cured.
Figure 3:
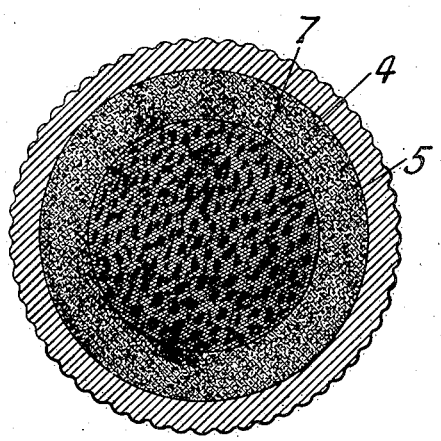
Fig. 3, is a section through the completed ball.

After the rubber is inserted with the hollow sphere the winding of the wire is continued until a wall of sufficient thickness is formed. The completed sphere is shown in Fig. 2 at 4, and is surrounded or encased by the two halves of the cover 5, which is then placed in the mold 6.

Upon heating, the cover will be cured and mass of rubber will expand during vulcanization and force its way through and within the spaces or interstices, while the central portion thereof is converted into a rubber sponge 7. In this manner the entire mass of wire within the ball is effectually filled with rubber.

As far as known to me the hollow sphere of wire wound upon itself and surrounding and enclosing a mass of sponge rubber a portion of which permeates the coils of wire, is new and as such the invention as set forth in the claims is entitled to full protection thereon. While the invention is described as applied to golf balls, it is obvious that it may also be applied to resilient balls for all purposes.

What is claimed is:

1. A method of manufacturing resilient balls comprising, forming a hollow sphere from convolutions of wire, inserting within the sphere during the process of formation, a mass of uncured rubber having a volatilizing agent incorporated therewith, providing a cover about said sphere and vulcanizing the ball whereby the mass of rubber is converted into sponge rubber.

2. A method of manufacturing resilient balls comprising, forming a hollow sphere from convolutions of wire about a mass of uncured rubber and a volatilizing agent, providing a cover about the sphere and vulcanizing whereby a portion of the rubber penetrates the interstices of the sphere and the remainder is converted into a mass of sponge rubber.

3. A method of manufacturing resilient balls comprising, forming a sphere from convolutions of wire about a mass of uncured rubber and a volatilizing agent and vulcanizing whereby a portion of the rubber penetrates the interstices of the sphere and the remainder is converted into sponge rubber.

4. A method of manufacturing resilient balls comprising, forming a resilient metallic sphere having located within it a mass of uncured rubber and a volatilizing agent and vulcanizing whereby the rubber is converted into a mass of sponge rubber.

5. A method of manufacturing resilient balls comprising, forming a wire sphere having located within it a mass of uncured rubber and a volatilizing agent and vulcanizing whereby the rubber is converted into a mass of sponge rubber.

OTTO J. KUHLKE.